United States Patent
Juels (10) Patent No.: US 8,528,085 B1
(45) Date of Patent: Sep. 3, 2013

(54) METHOD AND SYSTEM FOR PREVENTING DE-DUPLICATION SIDE-CHANNEL ATTACKS IN CLOUD STORAGE SYSTEMS

(75) Inventor: Ari Juels, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 83 days.

(21) Appl. No.: 13/338,413

(22) Filed: Dec. 28, 2011

(51) Int. Cl.
*G06F 11/00* (2006.01)
*G06F 12/14* (2006.01)
*G06F 12/16* (2006.01)
*G06F 7/00* (2006.01)
*G06F 17/30* (2006.01)
*G08B 23/00* (2006.01)

(52) U.S. Cl.
USPC ............................................................ 726/22

(58) Field of Classification Search
USPC ........................................... 726/22; 707/747
See application file for complete search history.

(56) References Cited

U.S. PATENT DOCUMENTS

| 7,603,452 B1 * | 10/2009 | Guo ............................... | 709/223 |
| 2012/0150954 A1 * | 6/2012 | Tofano ........................... | 709/204 |
| 2012/0166448 A1 * | 6/2012 | Li et al. .......................... | 707/747 |

OTHER PUBLICATIONS

Side channels in cloud services, the case of deduplication in cloud storage Danny Harnik, Benny Pinkas, Alexandra Shulman-Peleg IEEE Security&Privacy Nov./Dec. 2010 (vol. 8 No. 6) pp. 40-47.*
Approximating the Number of differences between remote sets Sachin Agarwal, Ari Trachtenberg 2006 IEEE Information Theory Workshop, Punta del Este, Uruguay, Mar. 13-17, 2006.*
Informed Content Delivery Across Adaptive Overlay Networks John W. Byers, Jeffrey Considine, Michael Mitzenmacher, Member, IEEE, and Stanislav Rost IEEE/ACM Transactions on Networking, vol. 12, No. 5, Oct. 2004.*

\* cited by examiner

*Primary Examiner* — Kambiz Zand
*Assistant Examiner* — Benjamin Kaplan
(74) *Attorney, Agent, or Firm* — Dergosits & Noah LLP; Todd A. Noah (57) ABSTRACT

An index-based proof-of-responsibility method and system for preventing side-channel attacks in data deduplication systems is described. A storage server computer creates a secret index referencing a specific random block in a file stored in a central data store. The server stores the hash value of the file along with the block referenced by the index. When a client computer submits a deduplication request regarding the file, server challenges the client to produce the block referenced by the index. If the proper file block is returned, the client has proven ownership of the file, and the request is granted. The server refreshes the index and associated challenge block after processing each request by a client computer.

20 Claims, 4 Drawing Sheets

METHOD AND SYSTEM FOR PREVENTING DE-DUPLICATION SIDE-CHANNEL ATTACKS IN CLOUD STORAGE SYSTEMS

BACKGROUND

Cloud storage as an archive backup resource allows users to store data off-site and minimize on-site storage resources; but cloud storage services may impose certain costs, especially if a large amount of data is archived. Certain techniques, such as data deduplication, compression and other forms of data optimization are often employed to reduce the amount of stored data sets by assigning one copy of a file (F) to multiple clients. A deduplication scheme stores only a single copy of repeating data and is most effective when applied across multiple users, which is a common scenario in cloud storage environments. However, certain side-channel attacks can be used to gain access to arbitrary size files of other users based on small hash signatures of these files.

Most deduplication systems maintain a database containing a hash h(F) of every currently stored file (or file fragment) F. Along with this hash is stored an access-control list enumerating the clients that have uploaded F and thus have the right to retrieve it. When a client presents a file G for deduplication, the system checks whether its hash h(G) already exists in the database as the hash h(F) (=h(G)) of a previously stored file F. If so, G is presumed to be identical to F. In this case, G is not stored in the system, and typically is not uploaded from the client. Instead, G is mapped onto F, in the sense that the client is enrolled on the access-control list for G. There are at least three types of attacks against such deduplication systems, including probing attacks, content-distribution network attack, and exfiltration attacks.

In a probing attack, if a client presents G (or h(G)), and the system does not upload G, then the client learns that G is already present in the system, and belongs to another client. Thus, a side-channel reveals the repository contents of existing clients, and sometimes the mere existence of a file F can leak sensitive information. Additionally, an attacker can use probing to mount a form-filling attack. For example if an attacker has access to a form F (e.g., a tax form) that a victim has filled in a particular field, S, (e.g., annual salary) and uploaded as a file F', and if the search space (entropy) for S is small enough, the attacker can learn S by repeating the following procedure: filling in known values (e.g., the victim's name and address) guessing a plausible value S* for S, constructing the associated filled-in form F*, and testing whether F*=F'.

In a content-distribution network (CDN) attack, a client may be enrolled on the access-control list for a file F merely by presenting the hash h(F). In essence, h(F) is treated as a credential for access to F. Consequently, one client can provide access to a large file F to other clients merely by presenting them with the compact value h(F). To obtain the file F, a client can falsely "deduplicate" F by presenting h(F), thereby gaining access rights that permit retrieval of F. For example, if a user wants to distribute a bootlegged video F through a backup service, he creates a free account and uploads the video, and makes the hash h(F) available to receivers. To obtain the video, a receiver sets up a free account, falsely "deduplicates" F by presenting h(F), and then retrieves F.

In an exfiltration attack, malware often seeks to exfiltrate sensitive data from clients, but confronts the challenge of initiating high-bandwidth, outbound connections without triggering intrusion alerts. An existing deduplication system can be exploited to create such a connection. A piece of malware can exfiltrate data F from a client via deduplication by instantiating F in a one-time content-distribution network. The result is a dropbox with a compact access credential h(F), and which is accessible from any client within the deduplication system.

These, and other side-channel attacks represent sources of vulnerability associated with present deduplication systems implemented in current cloud storage environments. Although certain preventative measures are available to require that requesting users prove ownership or authorization over target files, most are complex, resource-intensive solutions that impose high overhead costs. Moreover, such solutions do not always provide absolute certainty of proof-of-ownership by the client and are susceptible to sophisticated malware attacks.

BRIEF DESCRIPTION OF THE DRAWINGS

Advantages of the subject matter claimed will become apparent to those skilled in the art upon reading this description in conjunction with the accompanying drawings, in which like reference numerals have been used to designate like elements, and in which:

DETAILED DESCRIPTION

The subject matter presented herein provides a countermeasure to side-channel attacks to deduplication processes by adding a proof-of-responsibility (or proof-of-ownership) exchange with the client of a file intended for deduplication. Along with the hash value h(F) of every stored file, the server stores a secret index that references a random block within the file. The client must then return the file block corresponding to the index. If the proper file block is returned, the client has proven ownership of the file, and the client request is processed with respect to the target file.

Figure 1:
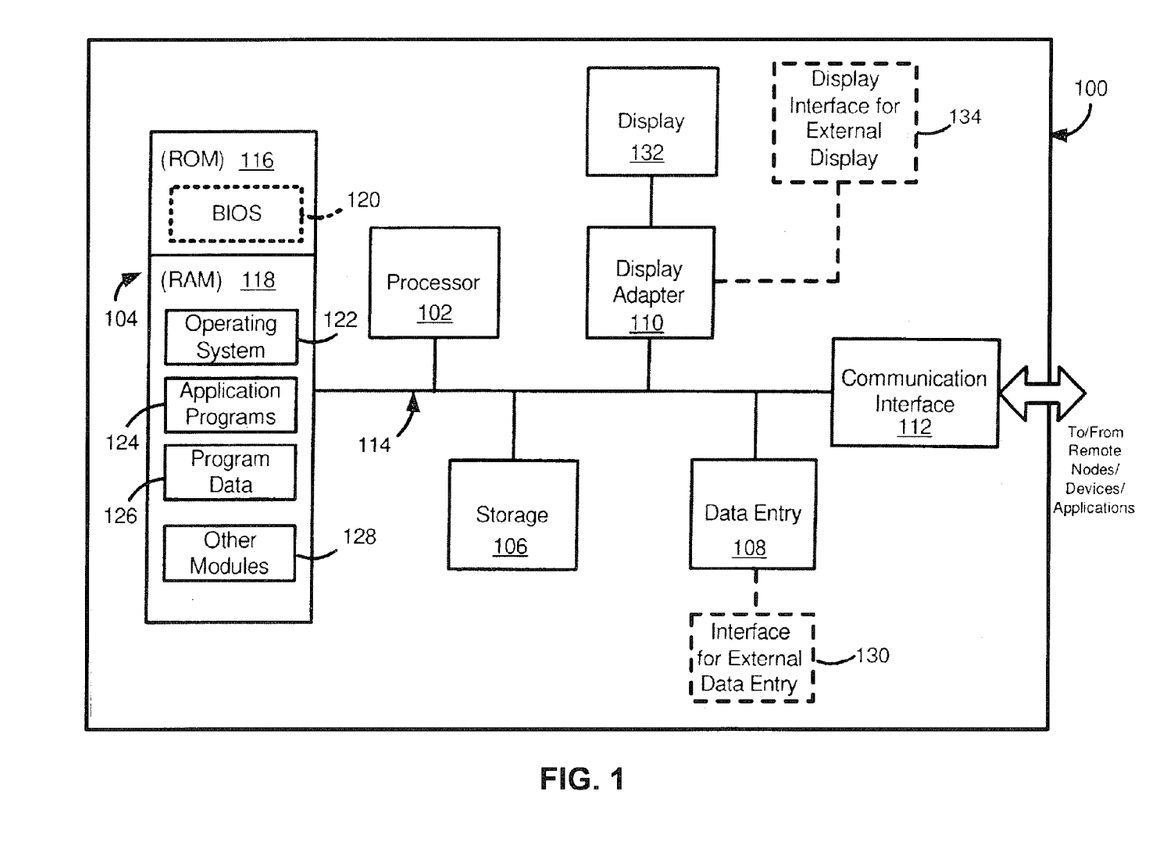
FIG. 1 is a block diagram illustrating an example hardware device in which the subject matter may be implemented.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, data entry module 108, display adapter 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106 and/or received via data entry module 108.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128. A user may enter commands and information into the hardware device 100 through data entry module 108. Data entry module 108 may include mechanisms such as a keyboard, a touch screen, a pointing device, etc. Other external input devices (not shown) are connected to the hardware device 100 via external data entry interface 130. By way of example and not limitation, external input devices may include a microphone, joystick, game pad, satellite dish, scanner, or the like. In some embodiments, external input devices may include video or audio input devices such as a video camera, a still camera, etc. Data entry module 108 may be configured to receive input from one or more users of device 100 and to deliver such input to processing unit 102 and/or memory 104 via bus 114.

A display 132 is also connected to the bus 114 via display adapter 110. Display 132 may be configured to display output of device 100 to one or more users. In some embodiments, a given device such as a touch screen, for example, may function as both data entry module 108 and display 132. External display devices may also be connected to the bus 114 via external display interface 134. Other peripheral output devices, not shown, such as speakers and printers, may be connected to the hardware device 100.

The hardware device 100 may operate in a networked environment using logical connections to one or more remote nodes (not shown) via communication interface 112. The remote node may be another computer, a server, a router, a peer device or other common network node, and typically includes many or all of the elements described above relative to the hardware device 100. The communication interface 112 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context.

In an embodiment, the computer system 100 includes one or more methods to eliminate or reduce the possibility of side-channel attacks to deduplication processes. One simple way to eliminate the side-channels described in the background is always to upload from the client any file F intended for deduplication. This process deprives the client of insight into the storage posture of the system, and while such an approach may be practical for small files, it clearly imposes considerable overhead for large files. A potentially more practical countermeasure is to require that a client requesting deduplication of any file F prove knowledge of, and thus possession of F in its entirety. A simple way to implement such a proof is for the server to select a random nonce r, which is an arbitrary number that is used only once; compute R=h(F,r); send r to the client and request that it compute R; and then compare the received value R' with R. This approach, however, requires that the server compute (or pre-compute) a fresh value R for every challenge, which is also largely impractical.

In an embodiment, the countermeasure to side-channel attacks is implemented by adding a proof-of-ownership or proof-of-responsibility exchange with the client of a file intended for deduplication. Along with the hash value h(F) of every stored file, the server stores a secret index that references a random block within the file. When submitting a deduplication request, the client must also return the file block corresponding to the index. If the proper file block is returned, the client has proven ownership of the file. This scheme allows a client user the ability to provide at least some degree of proof that he or she is validly entitled to retrieve a copy of a target file F stored by the storage server.

Figure 2:
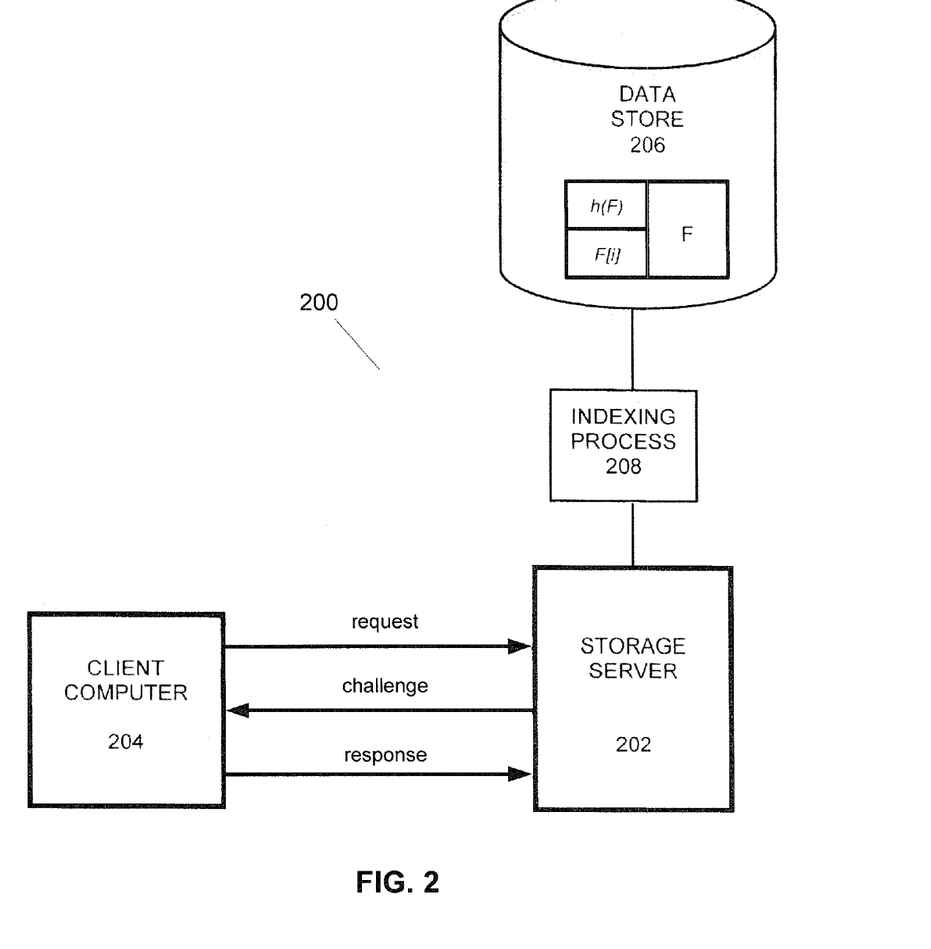
FIG. 2 illustrates a block diagram of a data storage system that implements a proof-of-responsibility scheme, under an embodiment.

FIG. 2 illustrates a block diagram of a data storage system that implements a proof-of-responsibility scheme, under an embodiment. As shown in FIG. 2, a storage server 202 stores files in a data store 206 for a multitude of different clients. System 200 may illustrate a cloud computing environment in which data, applications, services, and other resources are stored and delivered through shared data-centers and appear as a single point of access for the users. System 200 may also represent any other type of distributed computer network environment in which a central server controls the storage and distribution of data for different client users.

In an embodiment, system 200 represents a cloud storage system in which files are stored remotely for client users in a central data store 206 by a backup server 202 that is provided by a hosting company. The backup server implements a data deduplicaton method that stores single copies of individual files that may be used by multiple users. The data deduplication methods may be implemented through file-level deduplication techniques in which only a single copy of each file is stored, or block-level deduplication techniques in which files are segmented into blocks (fixed or variable sized), and only single copies of each block are stored. As shown in FIG. 2, the storage server 202 stores a single copy of file F for one or more client computers, including client 204. The client computer user is generally a user who created, co-created, modified, or viewed the file, and then requested that the file be stored on the central data store 206. Using certain deduplication methods, a single version of file F is stored by server 202 in data store 206 regardless of how many other users requested to store the file. The client-server interaction of system 200 processes file transfer requests that may include a request by the client to perform an act with respect to the target file F. The request may be a request to access, view, download, upload or otherwise process the file in some way. In general, in system 200, any such request comprises a deduplication request that is processed by the server. In a typical deduplication request sequence, the server determines whether a copy of the target file F already exists. If the file already exists, the server removes unnecessary copies to reduce storage requirements and marks the requesting client as a valid owner of the file.

To protect the robustness of the data storage system 200, a proof-of-responsibility mechanism is implemented to prevent side-channel attacks from allowing unauthorized users from gaining access to file F. For example, in present deduplication systems, a hash of the file is usually used by the server as a proxy for the entire file, so that any user who knows the hash value only would be marked as an owner of the file, and thus knowing only the hash value would enable one to get the entire file. To counteract this vulnerability, the deduplication system of FIG. 2 requires the client computer user to return proof of responsibility (or ownership) over file F before the server makes it available to the user. In this proof-of-responsibility case, the client computer 204 is the prover and the server 202 is the verifier.

Figure 3:
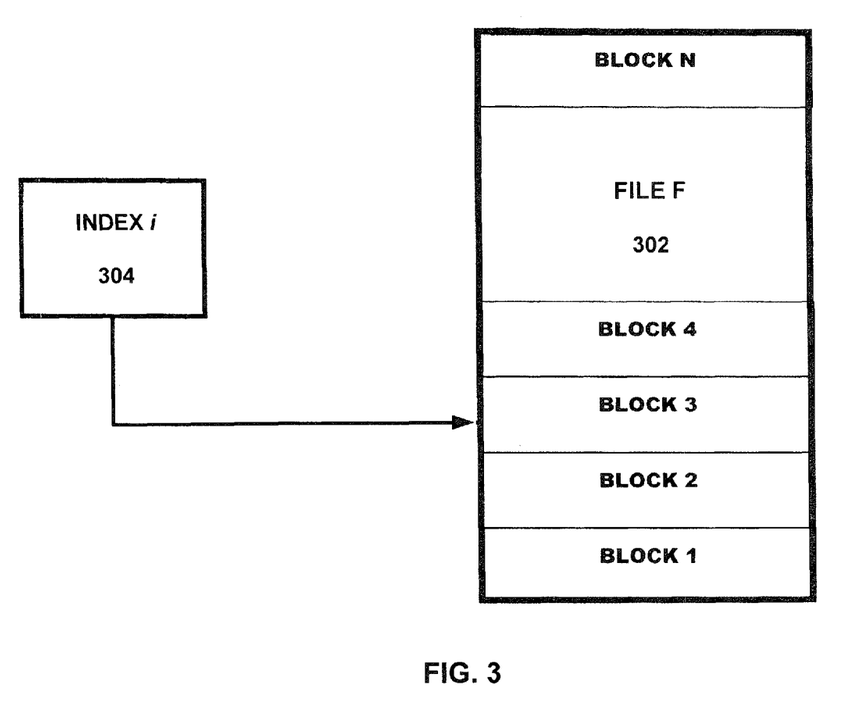
FIG. 3 illustrates the use of an index to identify a specific block within a file, under an embodiment.

As shown in FIG. 2, system 200 includes an indexing process 208 that is used by the server 202 to select a random, secret index of the file F[i]. This index references a specific portion of the file F, such as a specific block or group of blocks of the file. FIG. 3 illustrates the use of an index to identify a specific block within a file, under an embodiment. In general, file 302 comprises a number of blocks 1 to N. Each block is a sequence of bytes of the file and is generally of a size dictated by the file system. The blocks thus represent specific portions of the file. The index 304 generated by process 208 points to a specific block of the file, in this example, block 3 of file F. The file index F[i] is stored along with the hash value of the file h[F] by server 202 in the data store 206. The index is then used by the server to verify that a client 204 requesting the file F is a proper owner of the file. The index 304 can be any appropriate numeric or alphanumeric string that identifies the block number, location, offset, or other data sufficient to locate a specific block or group of blocks within the target file F. The index may be encoded by the server computer prior to transmission to the client, or it may be transmitted as regular data.

Figure 4:
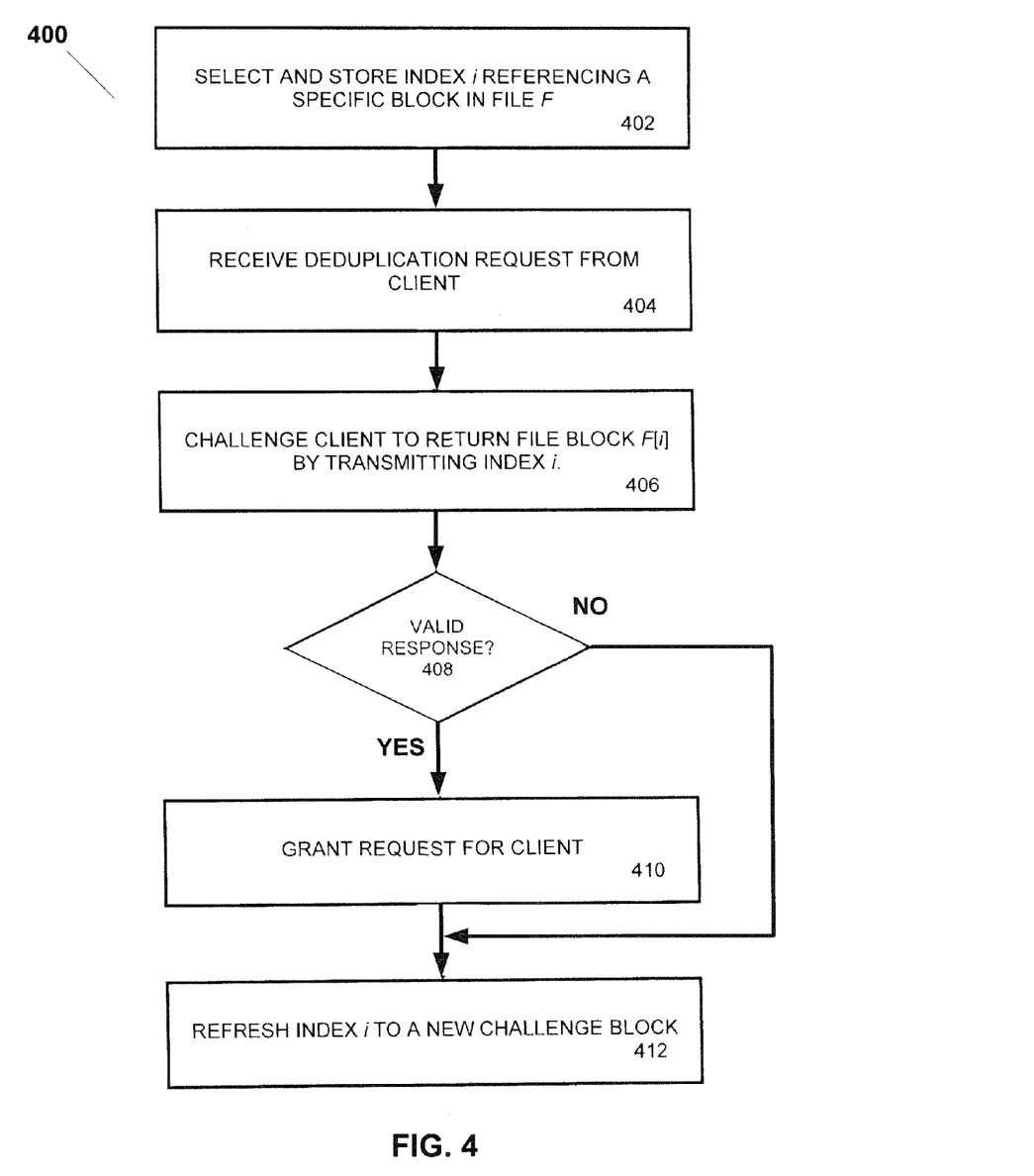
FIG. 4 is a flowchart that illustrates a method of using an index to provide proof-of-responsibility in a data deduplication system, under an embodiment.

FIG. 4 is a flowchart that illustrates a method of using an index to provide proof-of-responsibility in a data deduplication system, under an embodiment. Flowchart 400 illustrates method acts illustrated as flowchart blocks for certain steps involved in the request/challenge/response event sequence between client computer 204 and storage server 202 of FIG. 2. To challenge the client, the server picks a random index i and along with h(F), the server stores the corresponding file block F[i] (or hash thereof) for the randomly selected, secret index i, act 402. The server then receives a deduplication request from the client, act 404. Upon receiving the request, the server challenges the client to produce the file block F[i] by transmitting the index to the client, act 406. The server then compares the result returned by the client with the stored file block F[i]. If the returned file block matches the stored file block, the response is deemed to be valid as determined in act 408, and the deduplication request from the client is granted, act 410. Decision block 408 serves to validate the client user by comparing the block returned by the client to the stored block. This validation step essentially determines whether or not the client user has provided sufficient proof-of-responsibility by requiring an exact match between the returned block and the stored block. The blocks must match exactly in order for there to be validation. Whenever a client retrieves F, the server refreshes the associated challenge block, that is, it selects a new index i and stores the associated file block, act 412. If in step 408, it is deemed that the client did not return a valid response to the challenge, the server does not return any file to the client and proceeds to refresh the index to a new challenge block, act 412.

The index-based proof-of-responsibility scheme described herein operates on the premise that only a valid owner of the file would have and be able to provide the requested file block referenced by the index created by the storage server. The challenge requires that the requester provide an actual part of the file, rather than information about the file or derived from the file, such as simple hash value h[F]. By challenging the requester to provide part of the file, the system verifies that the requesting client has valid responsibility over the file.

The index-based proof-of-responsibility system may include certain additional mechanisms to provide greater assurance of the user's proof. In an embodiment, the server can create multiple indices for a single challenge-response cycle. In this case, the server stores multiple challenge blocks, each corresponding to a separate unique index. Any practical number of indices may be created and stored for this purpose, for example five to ten indices for blocks scattered throughout the entire file. For this embodiment, the requesting client would be required to return blocks corresponding to each of the created indices to be validated as a proven responsible client.

In an alternative embodiment, the indexed blocks that are stored by the server are processed using a Bloom filter. In general, a Bloom filter is an array of M bits which is queried at k quasi-randomly selected positions, and provides the functions of a non-cryptographic hash. In further alternative embodiment, a cryptographic hash function could be used to process the indexed block. In either case, the challenged client would need to return the correct processed block (or blocks) in response to the index value(s) provided by the server.

Although embodiments were described in relation to the use of file blocks as the basis of the index-based proof-of-responsibility method, it should be noted that other randomly accessible file portions could also be used, such as sub-blocks, sectors, pages, paragraphs, and other appropriate file sub-divisions.

The index-based proof-of-responsibility structure described herein provides a relatively lightweight non-intrusive and non-resource intensive mechanism for validating a requesting user as a valid owner or possessor of the requested file. Although such a solution may be susceptible to certain concerted malware or exfiltration attacks, it is generally considered to provide acceptable practical protection against side-channel attacks in relation to the processing overhead required for implementation.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A computer-implemented method for proving responsibility over files stored in a data storage system, the method comprising:

generating, in index process executed by a storage server computer in a network, an index referencing a block within a file stored in a central data store accessible by the storage server;

storing, by the index process, the block referenced by the index in the central data store;

receiving a request to process the file from a client computer coupled to the storage server over the network;

transmitting the index to the client computer as a challenge for the client computer to return the block referenced by the index;

comparing a block returned by the client to the stored block to validate the response by the client computer; and granting the request to access the file if the block returned by the client matches the stored block.

2. The method of claim 1 further comprising refreshing the index to reference a new block upon comparing the returned block with the stored block.

3. The method of claim 1 further comprising storing a digest of the block in the central data store, and processing the digest through a Bloom filter process.

4. The method of claim 1 further comprising storing a digest of the block in the central data store, and processing the digest through a cryptographic hash function.

5. The method of claim 1 wherein when the network comprises a cloud-computing environment and wherein the storage server stores multiple files for multiple different client computers on the central data store.

6. The method of claim 5 wherein the storage server executes a data deduplication process, and wherein the method further comprises checking whether a previous copy of the file exists in the central data store.

7. The method of claim 6 wherein the request to process the file from the client computer comprises a request to upload the file to the central data store.

8. The method of claim 1 wherein the index comprises a numeric value specifying a location of the block within the file stored on the central data store.

9. The method of claim 1 further comprising:
creating a plurality of indices, each index referencing a respective unique block in the file;
storing each of the respective unique blocks in the central data store; and
transmitting the plurality of indices to the client computer to challenge the client computer to return each of the respective unique blocks for comparison with the stored respective unique blocks.

10. A computer program product, comprising a non-transitory computer-readable medium having a computer-readable program code embodied therein, the computer-readable program code adapted to be executed by one or more processors to implement a method for configuring a multi-path index, the method comprising:
generating, in index process executed by a storage server computer in a network, an index referencing a block within a file stored in a central data store accessible by the storage server;
storing, by the index process, the block referenced by the index in the central data store;
receiving a request to process the file from a client computer coupled to the storage server over the network;
transmitting the index to the client computer as a challenge for the client computer to return the block referenced by the index;
comparing a block returned by the client to the stored block to validate the response by the client computer; and
granting the request to access the file if the block returned by the client matches the stored block.

11. A system for providing proof-of-responsibility in a data deduplication system, the system comprising:

a processor-based data storage system executed on a server computer that is configured to store a plurality of files for a plurality of different client users;

an index processing module configured to generate an index referencing a block within a file stored in a central data store accessible by the server computer, and further configured to store the block referenced by the index in the central data store;

a transceiver component configured to receive a request to process the file from a client computer coupled to the server computer over a network, and to transmit the index to the client computer as a challenge for the client computer to return the block referenced by the index; and a validation module configured to compare a block returned by the client to the stored block to validate the response by the client computer to cause the server computer to grant the request to access the file if the block returned by the client matches the stored block.

12. The system of claim 11 wherein the index processing module is further configured to refresh the index to reference a new block upon comparing the returned block with the stored block.

13. The system of claim 11 further comprising a Bloom filter process configured to encode a digest of the block referenced by the index through a Bloom filter prior process.

14. The system of claim 11 further comprising a hash encryption process configured to process a digest of the block referenced by the index through cryptographic hash function.

15. The system of claim 11 wherein when the network comprises a cloud-computing environment and wherein the server computer executes a data deduplication process that is configured to check whether a previous copy of the file requested to be processed by the client computer exists in the central data store.

16. The system of claim 11 wherein the index comprises a numeric value specifying a location of the block within the file stored on the central data store.

17. The system of claim 11 wherein the index processor module is further configured to create a plurality of indices, each index referencing a respective unique block in the file; store each of the respective unique blocks in the central data store; and transmit the plurality of indices to the client computer to challenge the client computer to return each of the respective unique blocks for comparison with the stored respective unique blocks.

18. A method of processing proof-of-responsibility challenges in a data deduplication system, the method comprising:
storing in a data store of a server computer, a random block of a file referenced by a secret index;
transmitting the index to a client computer upon a deduplication request by the client computer regarding the file, as a request for the client computer to return the block referenced by the index;
validating a user of the client computer to be a proven owner of the file upon an exact match between the stored file block and the block returned by the client computer through a comparison process of the server computer; and
refreshing the index to reference a new block upon comparing the returned block with the stored block.

19. The method of claim 18 further comprising processing the block referenced by the index through one of: a Bloom filter and a cryptographic hash function.

20. The method of claim 18 wherein when the network comprises a cloud-computing environment and wherein the storage computer stores multiple files for multiple different client computers on the central data store.

* * * * *